United States Patent [19]

Tsao

[11] Patent Number: 5,954,414

[45] Date of Patent: Sep. 21, 1999

[54] MOVING SCREEN PROJECTION TECHNIQUE FOR VOLUMETRIC THREE-DIMENSIONAL DISPLAY

[76] Inventor: Che-Chih Tsao, 1305 Stearns Hill Rd., Waltham, Mass. 02154

[21] Appl. No.: 08/702,047

[22] Filed: Aug. 23, 1996

[51] Int. Cl.⁶ .................................................. G03B 21/28
[52] U.S. Cl. .............................. 353/7; 353/10; 359/478; 359/479
[58] Field of Search .................................. 353/7, 10, 46, 353/50, 51; 349/446, 458, 478, 479, 471, 477, 462; 348/37, 51, 54, 44

[56] References Cited

U.S. PATENT DOCUMENTS

| | | | |
|---|---|---|---|
| 5,082,350 | 1/1992 | Garcia et al. | 359/478 |
| 5,148,310 | 9/1992 | Batchko | 359/479 |
| 5,537,251 | 7/1996 | Shimada | 359/479 |
| 5,678,910 | 10/1997 | Martin | 359/478 |

*Primary Examiner*—William Dowling

[57] ABSTRACT

This invention relates generally to new and improved approaches for displaying volumnetric three-dimensional (3D) images. The basic idea features new optical-mechanical mechanisms enabling creation of volumetric 3D images by successive projection of whole frames of 2D images. This new method projects a series of frames of 2D images, through an optical-mechanical image delivery system, onto a translucent screen which moves periodically and sweeps a space. As viewed from outside the space, the series of 2D images distributed in the space form a volumetric image because of the after-image effect of human eyes. Many viewers can walk around the space and see the image from omni-directions simultaneously without wearing any kind of glasses.

18 Claims, 9 Drawing Sheets

Fig. 3b (Top View)

CO//DE;  C'O//DE';  triangle OPQ = triangle OP'Q' magnification $m = \dfrac{fB_1}{fA}$

Fig. 6b

An example design of the Moving Zoom Lens component A: diverging lens, fA = -50 mm
component B: converging lens, fB = 100 mm
object-to-image distance T varies from 630 to 780 mm
magnification m = -1 calculated component positions: (unit in mm)

| T | D | So | Si |
|---|---|---|---|
| 630 | 96.54 | -111.2 | 422.3 |
| 667.5 | 92.89 | -124.9 | 449.7 |
| 705 | 89.81 | -138.4 | 476.8 |
| 742.5 | 87.17 | -151.8 | 503.6 |
| 780 | 84.88 | -165.0 | 530.1 |
| stroke 150 | 11.66 | 53.8 | 107.8 |

MOVING SCREEN PROJECTION TECHNIQUE FOR VOLUMETRIC THREE-DIMENSIONAL DISPLAY

BACKGROUND OF THE INVENTION

From users' point of view, there are currently two types of computer displays for 3D (three-dimensional) visualization: (1) Perspective presentation: presenting perspective views of 3D objects on a conventional 2D display (sometimes called "2.5D"); and (2) 2D display with depth: presenting images with a sense of depth on physically-2D display, such as holographic or stereoscopic displays. Perspective presentation of 3D images can be created by 3D software tools on a 2D screen. However, there are still many cases where 2.5-D images can not convey the information clearly without confusion. For example, many users of 3D CAD (computer aided design) tools have a hard time in positioning objects in a 2.5-D perspective graphics environment. Holographic and stereoscopic displays have been developed to provide 3D illusion. One major issue of computer generated holography is the vast computation power required for calculating the hologram corresponding to the 3D image, which makes the technology still far from practical use. [Benton 1992, Report 1990] The main problem with stereoscopic displays is the need of helmets and glasses. Special screen illumination and filtering technologies have been developed to remove the need for glasses in stereoscopic type display. But display resolution is generally sacrificed and head tracking is necessary, which means only one user can see 3D) images at any time. [Walko 1995, Shandle 1993]

This invention relates generally to new and improved approaches for displaying volumetric three-dimensional (3D) images. A volumetric 3D display is capable of displaying 3D volumetric images in a spatial region. Each "voxel" (relative to "pixel" on a 2D display) on a 3D image displayed by a volumetric display locates actually and physically at the spatial position where it is supposed to be, and light rays travel directly from that position toward omni-directions to form a real image in the eyes of viewers. As a result, a volumetric 3D display has 360° view angle, allows multiple viewers, does not require glasses, and can be a very useful new display device. Potential applications in medical displays, radar/sonar displays, computer aided design, and electronic games are expected.

There have been several previous approaches on displaying volumetric 3D images. One of the early approaches is the Varifocal Mirror. It consists of a vibrating mirror and a stationary CRT (cathode ray tube). A series of cross sectional images are displayed in sequence on the CRT, which, as viewed through reflection from the vibrating mirror, form a volumetric 3D image. [Traub 1967] This approach has a very limited view angle because images are inside the mirror.

A second type of volumetric display uses a rotating or reciprocating LED (light emitting diode) matrix. A sequence of 2D cross sectional images is displayed as the LED matrix rotates or moves in space to create 3D images. [Berlin] However, moving large area LED panels at high frequency creates reliability problem and signal coupling issues.

Another type of volumetric 3D display uses the intersecting light spot of a scanning laser beam on a moving screen or disc, which sweeps across a volume, to generate 3D images. [Williams 1989, Soltan 1992, Batchko 1992] This approach was based on well established laser beam scanning technology. However, this "point scanning" method seriously limits data rate, resolution, brightness, and color. Laser scanning rate is limited by the number of reflecting faces of the polygon mirror and the resonant frequency of scanner structure. It has been estimated that the number of data point per volume is limited to about 30,000, which is far from enough for high quality 3D images. [Solomon 1993] As a result, only wire frame or coarse bits images are possible.

Still another approach uses a moving screen coated with phosphor to receive electron beams emitted from stationary sources.[Blundell 1994] This is also "point scanning approach" and has similar problems as the scanning laser approach. There is another type of approaches which uses the intersection of two laser beam or two electron beams to excite an opto- or electro-sensitive material in a box or sphere.[Rowe 1977, Korevaar 1989] This "two step excitation" method again suffers the "point scanning" limitation.

There have been recent works using whole frame display instead of "point scanning". One work by NIST (National Institute of Standards and Technology) uses a piezo-based fast focusing lens to project image frames to a stack of PDLC screens [Paek 1996]. Another work uses a fixed focal-length projection lens to project images from a stack of LCD panels [Hattori 1992]. Both approaches have limited resolution because the number of LCD panels or screens in the stack in physically limited.

A practical volumetric image display must have adequate resolution, enough brightness, and allow viewing by multiple users. None of the previous techniques reviewed above can satisfy the three requirements, due to the limitation of their structure, or resolution, or the "point scanning" nature.

BRIEF SUMMARY OF THE INVENTION

This invention present a new approach for volumetric 3D display called Moving Screen Projection. The principle is to sweep a display screen across a space periodically and rapidly, and sequentially project on the screen a series of image frames within which each frame contains specific 2D images and is projected as the screen moves to a specific, corresponding position. As the display screen sweeps, a display space swept by the screen can be defined, and the set of 2D image frames are thereby distributed and displayed over the display space. This set of 2D image frames, when viewed from outside the display space, forms a 3D volumetric image, because of the after-image effect (persistence of vision) of human eyes. The image actually occupies space and can be viewed from different angles by many viewers simultaneously without the need of any glasses.

In analogy, Moving Screen Projection is the 3D extension of a 2D computer display. In any 2D computer display, a single light spot sweeping across the 2D screen forms a visible 2D image by the persistence of vision. In the volumetric 3D display, a 2D image surface sweeping across the 3D space forms a 3D volumetric image.

A volumetric 3D display based on the Moving Screen Projection technique features three major portions:

(1) The moving screen: The periodically moving screen forms the display space and displays the projected images. Basically, there are two ways to sweep the screen over a space. The screen can be rotated or the screen can be reciprocated. For simplicity, these two approaches are termed as the Rotating Approach and the Reciprocating Approach respectively.

(2) The image delivery mechanism: The image delivery mechanism relays the optical image projected from the image projector onto the moving screen for displaying. The mechanism keeps the size and focus of the projected image frame invariant as the screen moves, and also keeps the orientation of the projected image frame synchronous to the moving screen. (Because direct whole-frame projection from the projector onto the screen is not possible due to the constant motion of the screen.) In the Rotating Approach, a rotating reflectors mechanism consisting of a multi-mirror replay reflector rotating at a speed of ½ of the speed of the rotating screen and a system of second relay reflectors rotating in synchronization with the screen can achieve the function of the image delivery mechanism, with proper optical alignment. In the Reciprocating Approach, three mechanisms can be used. The first mechanism is the reciprocating reflectors mechanism, which consists of a system of reflectors moving synchronously with but at a speed of ½ of the speed of the reciprocating screen. The second mechanism is the moving condenser mechanism, which consists of a pair of converging lens aligned to the same optical axis. The first lens is fixed and has the image generating panel of the image projector at its focal plane. The second lens reciprocates with the screen and always has the screen at its focal plane. The third mechanism is the moving zoom lens mechanism, which consists of a zoom projection lens which zooms in response to the reciprocating motion of the screen such that the images can be projected onto the moving screen with their size, focus, and orientation invariant.

(3) The image projector: The image projector generates and projects the set of 2D image frames, through the image delivery mechanism, onto the moving screen. The image projector generally consists of a image generating panel, a projection lens, and a light source.

The projection light can further be modulated, by either switching the light source or using a light shutter, to control the location and the forms of images displayed in the display space. By projecting different contents into two or more successive volume sweeps, the contents can appear superimposed in the same display space, when the display space is refreshed fast. By projecting images of slight variations into successive volume sweeps, animation of 3D volumetric images can be created.

DESCRIPTION OF THE INVENTION

Figure 1:
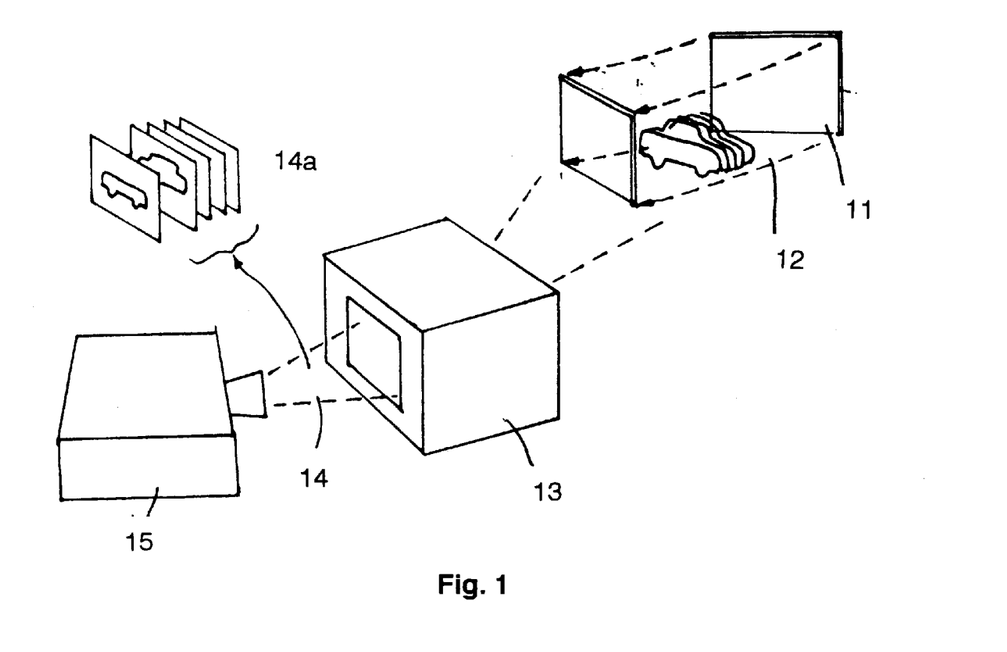
FIG. 1 illustrates the basic concept of the Moving Screen Projection technique.

The invention can be described in detailed with the help of the following drawings:

FIG. 1 illustrates the basic concept of the Moving Screen Projection technique, which consists of three major portion:

(1) The moving screen: The periodically moving screen 11 displays the projected images and forms the display space 12. Basically, there are two ways to sweep the screen over a space. The screen can be rotated or the screen can be reciprocated. For simplicity, these two approaches are termed as the Rotating Approach and the Reciprocating Approach respectively. The screen can be made of a translucent material so that the projected images can be visible from both sides of the screen.

(2) The image delivery mechanism: The image delivery mechanism 13 relays the projection beam 14, which contains a set of 2D image frames 14a), projected from the image projector onto the moving screen for displaying. The mechanism keeps the size and focus of the projected image invariant as the screen moves, and also keeps the orientation of the projected image frame synchronous to the moving screen. (Because direct whole-frame projection from the projector onto the screen is not possible due to the constant motion of the screen.)

(3) The image projector: The image projector 15 generates and projects the set of 2D image frames 14a, through the image delivery mechanism 13, onto the moving screen 11. The image projector generally consists of a image generating panel, a projection lens, and a light source.

By sweeping the screen across the space periodically and rapidly, and sequentially project onto the screen a series of 2D image frames, e.g. the profiles of an auto-body 14a in FIG. 1, the set of 2D image frames can thereby be distributed and displayed over the display space, with each frame located at a specific position in the space. This set of 2D image frames, when viewed from outside the display space, forms a 3D volumetric image, because of the after-image effect (persistence of vision) of human eyes. The image actually occupies space and can be viewed from different angles by many viewers simultaneously without the need of any glasses.

Figure 2A:
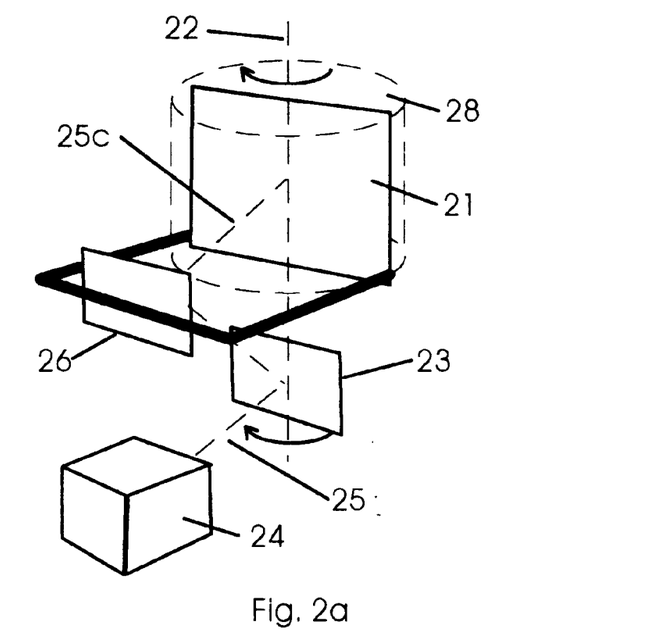
FIG. 2a–c illustrates the principle of the rotating reflectors mechanism.

For different ways of screen motion, different image delivery mechanisms were used. In the Rotating Approach, an optical-mechanical mechanism consisting of rotating reflectors receives projected image from the projector and relay the image onto the rotating screen. The basic concept is illustrated in FIG. 2a. The rotating screen 21 rotates about an axis 22, which is parallel to and passes through the surface of the screen 21. The relay reflector 23 rotates coaxially with and in the same direction as the screen 21 but at half the speed of the screen. The axis 22 is also parallel to and passes through the surface of the relay reflector 23. Due to this difference in rotation speed between the relay reflector and the screen, the mirror image 24a of the stationary projector 24 can rotate synchronously with the screen 21 and always face the screen. By using a second relay reflector 26 rotating with the screen, the projection beam 25 can be delivered onto the screen. As a result, a 2D image frame can be projected onto the rotating screen, with its size and focus invariant, and its orientation in synchronization with the rotating screen.

Figure 2B:
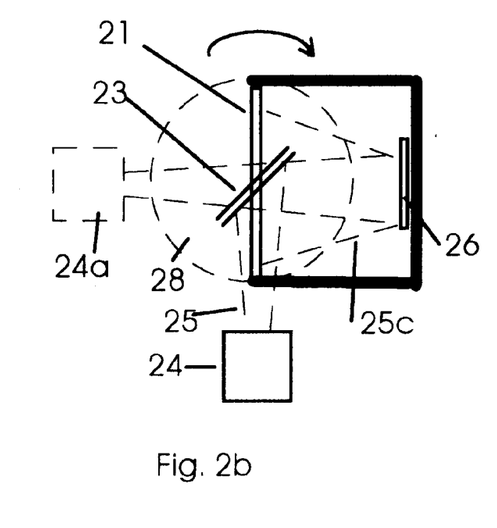
Figure 2C:
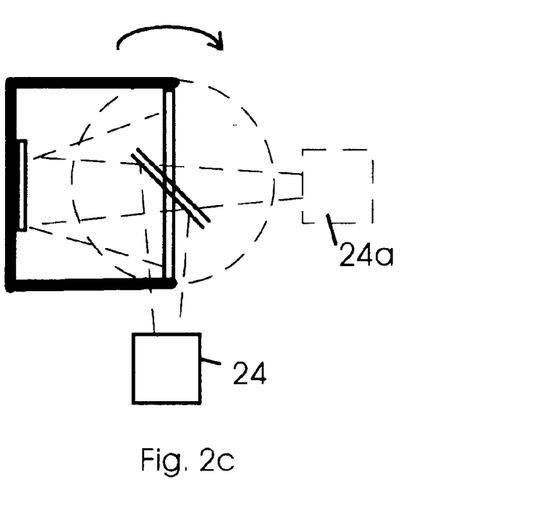

The relay reflector 23 in FIG. 2a can be a flat reflector with reflective surfaces on both sides. As the reflector surface becomes nearly parallel to the projection beam 25, the relay reflector enters a reflection dead-zone. For a 2-side relay reflector, its enters the dead-zone every ½ revolution. During this period, the screen 21 rotates 1 revolution (because the relay reflector rotates at ½ speed of the screen). Because the screen can sweep the whole cylindrical display space 28 in ½ revolution, the display space is swept twice during the period when the relay reflector rotates ½ revolution. In summary, one revolution of the screen contains two volume sweeps (i.e. complete sweeps of the display space by the screen), and the relay reflector rotates ½ turn and passes the reflection dead-zone 1 time during this period. As a result, for every two successive volume sweeps, only one receives a complete projection beam through the relay reflectors, which is illustrated in FIG. 2b and FIG. 2c by top view and the other volume sweep receives incomplete projection beam due to the relay reflector's entering the dead-zone. Accordingly, one screen revolution contains one effective volume sweep during a ½ revolution period, and one incomplete volume sweep during the other ½ revolution period.

Figure 3A:
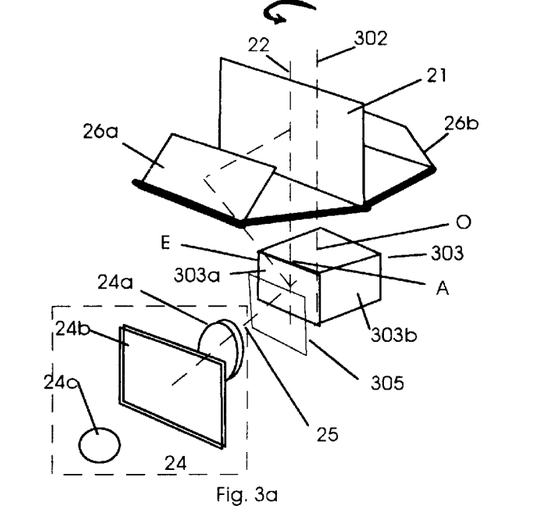
FIG. 3a–j illustrates the rotating reflectors mechanism with a multi-mirror relay reflector system.
Figure 3B:
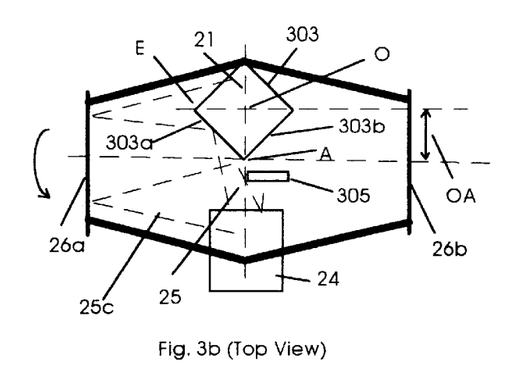
Figure 3C:
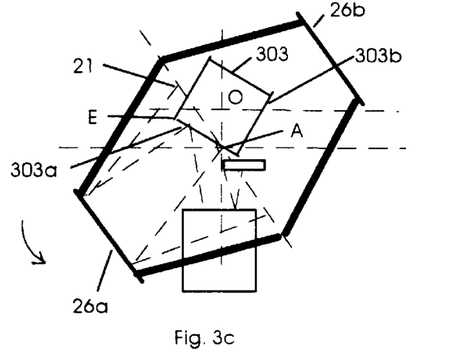
Figure 3D:
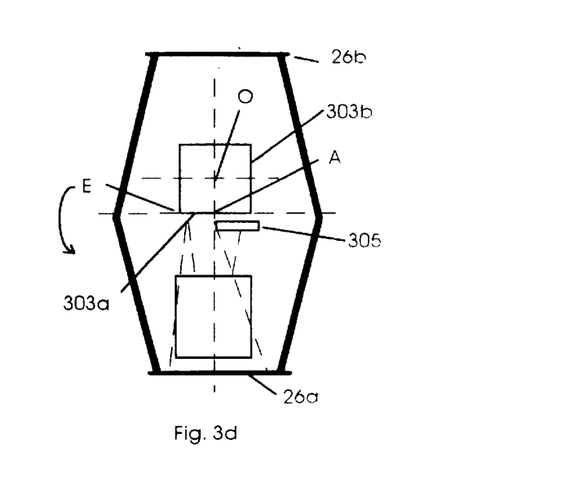

It is desirable to eliminate the dead-zone and make both volume sweeps in one screen revolution capable of receiving complete projection beam. A multi-mirror relay reflector system can be used to achieve this goal. FIG. 3a illustrates such a system. FIG. 3a is similar to FIG. 2 except that a multi-mirror reflector block 303 is used as the relay reflector and a shutter 305 is placed between the multi-mirror reflector and the projection lens 24a. The multi-mirror reflector block 303 has 4 reflective surfaces, any two adjacent surfaces are perpendicular to each other. All surfaces have an equal size and are parallel to the axis 22. The multi-mirror block 303 revolves about axis 302, which passes through the center point O of the block and is parallel to axis 22. The multi-mirror reflector 303 revolves at a speed ½ of that of the rotating screen 21. As the multi-mirror reflector revolves, the center point O and axis 302 reciprocates with respect to axis 22 so that axis 22 always passes through and is parallel to one of the four reflective surfaces. There are two second relay reflectors 26a and 26b, facing the opposite sides of the screen respectively, which rotate in unison with the screen.

Figure 3E:
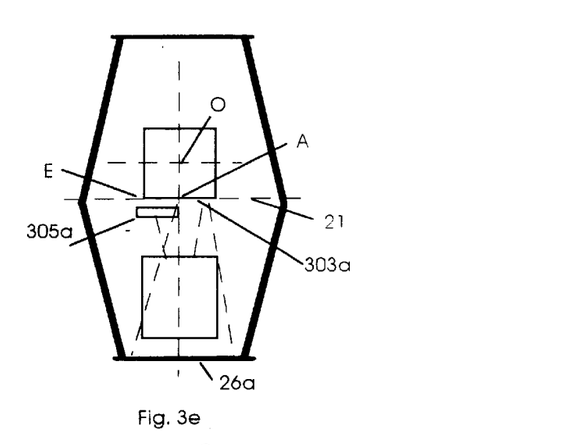
Figure 3F:
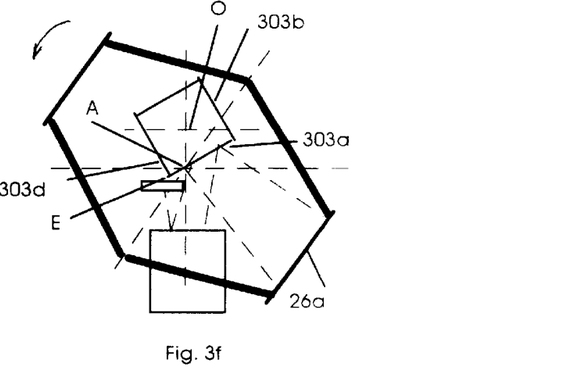
Figure 3G:
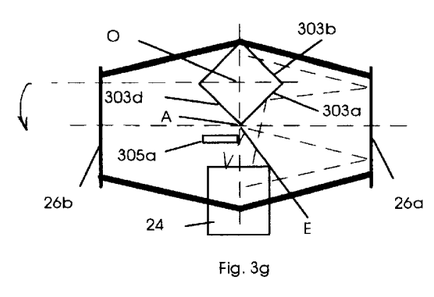
Figure 3H:
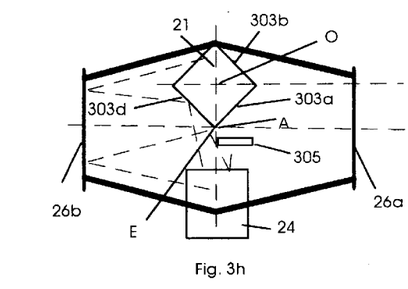

The sequence of FIG. 3b–h explain how the multi-mirror relay reflector mechanism eliminates reflection dead-zone. From FIG. 3b to 3d, the screen 21 and 2nd relay reflectors 26a and 26b rotate about A (where axis 22 touches the surface of one of the reflective surfaces of the multi-mirror relay reflector 303) for ¼ revolution. The multi-mirror reflector revolves at a speed ½ of that of the rotating screen 21, and the center point O moves toward point A so that the reflective surface 303a is always in contact with point A. During this period, reflective surface 303a is the acting relay reflector; and the shutter 305 blocks the reflective surface 303b so that the projection beam 25 can reach the screen through only reflective surface 303a and 2nd relay reflector 26a. This is to avoid confusion of simultaneous projection from both sides of the screen. While the shutter blocks half of the projection beam, complete image frames can still be projected onto the screen as long as the projection lens 24a is not too far away from the reflector 303. This fact has been confirmed through experimental observation by the applicant. As reflective surface 303a becomes parallel to the screen 21, the shutter 305 shifts its position to 305a, as shown in FIG. 3e. From FIG. 3e to 3g, the screen and the 2nd relay reflectors rotate about A (axis 22) for another ¼ revolution. The multi-mirror relay reflector still revolves at a speed ½ of that of the rotating screen 21, and the center point O now moves away from point A so that the reflective surface 303a is always in contact with point A. During this period, reflective surface 303a and the 2nd relay reflector 26a are still the acting reflectors, with the shutter 305a blocking reflective surface 303d. From FIG. 3b to 3g, the screen 21 revolves ½ turn and hence sweeps 1 complete volume which receives the complete projection beam. By shifting the shutter 305a back to position 305, as shown in FIG. 3h, one can see that a new cycle begins, as FIG. 3h is basically identical to FIG. 3b except that reflective surface 303d and the 2nd relay reflector 26b are now acting reflectors. Therefore, starting from FIG. 3h, the screen and the 2nd relay reflectors can make another ½ revolution and sweep the 2nd volume, still receiving a complete projection beam. As a result, the system can create two effective volume sweeps for every one revolution of the screen, and the reflection dead-zone is eliminated.

Figure 3I:
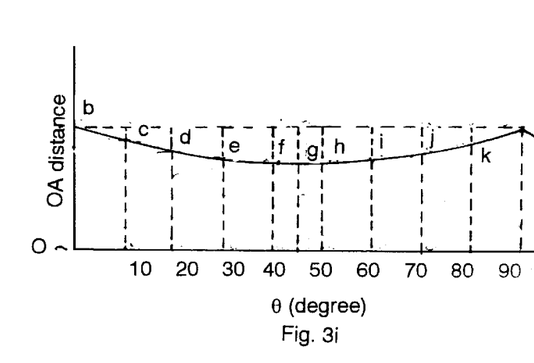
Figure 3J:
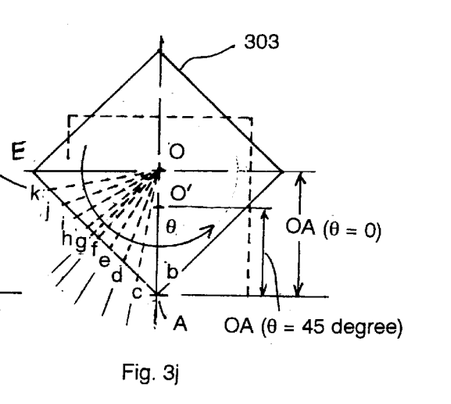

FIG. 3i shows OA, the distance between axis 22 and axis 302, as a function of the angle of rotation of the multi-mirror relay reflector 303. The OA function actually corresponds to the distance from the center O to the edge of the reflective surfaces of the multi-mirror relay reflector 303, as shown in FIG. 3j. That is, distances Ob, Oc, . . . and Ok in FIG. 3j corresponds to Ob, Oc, . . . and Ok in FIG. 3i, which makes the reflective surfaces always in contact with point A as the multi-mirror relay reflector rotates. The displacement of the center point O as a function of the angle of rotation of the multi-mirror relay reflector is also represented in FIG. 3i, which is (ObOA). For example, referring to FIG. 3j, when the multi-mirror relay reflector rotates 45 degree (⅛ turn), the center point O reaches point O', where OA equals Og and the center point O moves toward A a full stroke of (Ob-OA), which is Qg, according to FIG. 3i.

Figures 4A, 4C:
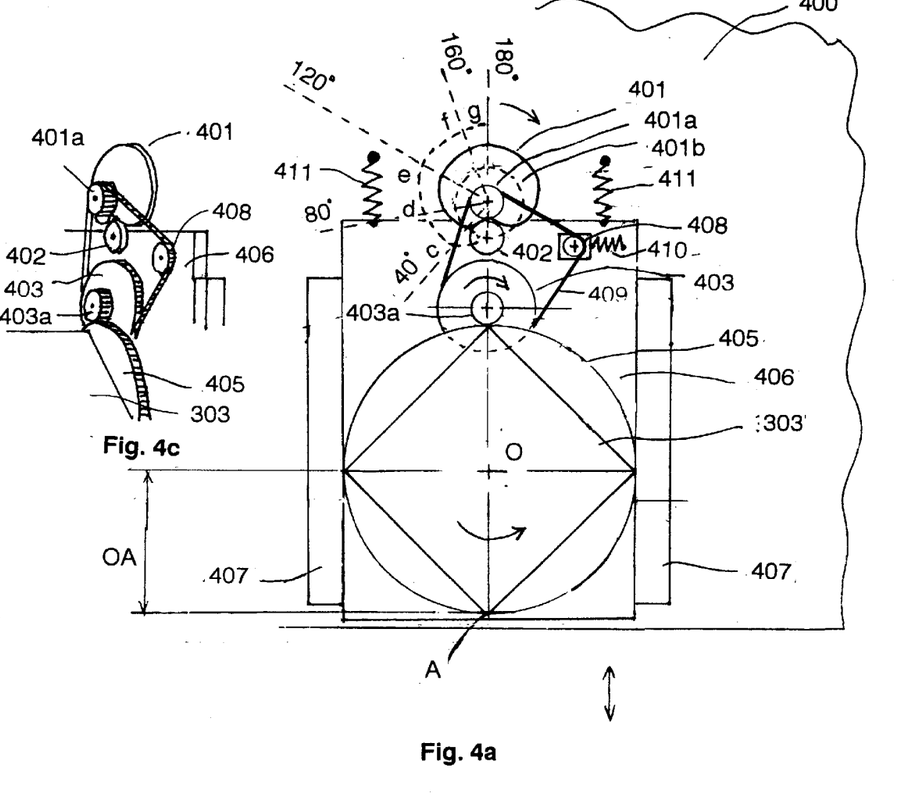
FIG. 4a–4b illustrates one preferred embodiment of the multi-mirror relay reflector system.

The reciprocating motion of the multi-mirror relay reflector can be achieved in many ways, as long as the displacement function of FIG. 3i is satisfied. FIG. 4a shows one preferred embodiment in plane view and FIG. 4c shows its perspective view. A cam wheel 401 and a follower wheel 402 is used to create the motion required by the displacement function of FIG. 3i. The multi-mirror relay reflector 303 is mounted on a slide 406, which can move linearly along rails 407 which are attached to the base 400. The axis of the follower wheel 402 is fixed to the slide, and the axis of the cam is fixed to the base 400. The rotation of the cam can therefore make the slide reciprocate, and hence the multi-mirror relay reflector. The tensioned spring 411 ensures the contact between the cam and the follower at all time. The cam profile can be designed based on the OA function in FIG. 3i. For one revolution of the cam to correspond to one motion cycle of the slide, the (Ob–OA) function corresponding to a 90 degree period in FIG. 3i can be spread over a 360 degree period to determined the cam profile, as sketched in FIG. 4a.

It is also important to synchronize the revolution of the multi-mirror relay reflector to the reciprocating of the slide. For each revolution of the cam wheel, the slide reciprocates one cycle and the multi-mirror relay reflector rotates ¼ revolution (90 degree) (as being described in FIG. 3). This can be achieved through a gear and timing belt system. For example, in FIG. 4a, gear 401a, which is attached to the same axis as the cam 401, drives gear 403 through a timing belt 409. Gear 403a, which is attached to the same axis as the gear 403, then drives gear 405, onto which the multi-mirror relay reflector 303 is attached. By selecting suitable gear ratios, the 4:1 (cam 401 to relay reflector 303) ratio can be obtained. Because the slide, as well as all gears attached to it (403, 403a, and 405), reciprocates relative to gear 401a, an idle gear 408 and a belt tensioner spring 410 are used to maintain the proper operation of the gear-belt system.

To achieve the proper rate ratio between the relay reflector and the rotating screen, an additional gear and belt system can be used. An example has been described in the previous application (Ser. No. 08/548,382, filed Oct. 26, 1995). In summary, the rotation rate ratio of the cam to the relay reflector to the screen is 4:1:2.

Figure 4B:
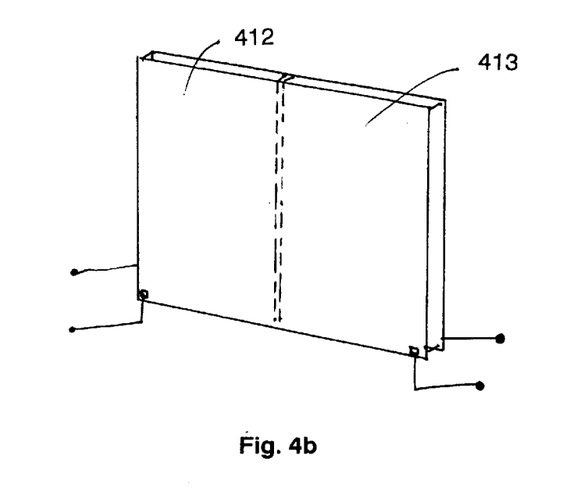

The light shutter 305 can be of many types. One example is to use a liquid crystal light shutter with two independent shutter area, as shown in FIG. 4b. These types of shutter can be custom made in, for example, Displaytech Inc. of Boulder, Colo. A control circuit can control the shutter according to the position of the relay reflector, which can be detected using a position sensor, such as an encoder.

Figure 5:
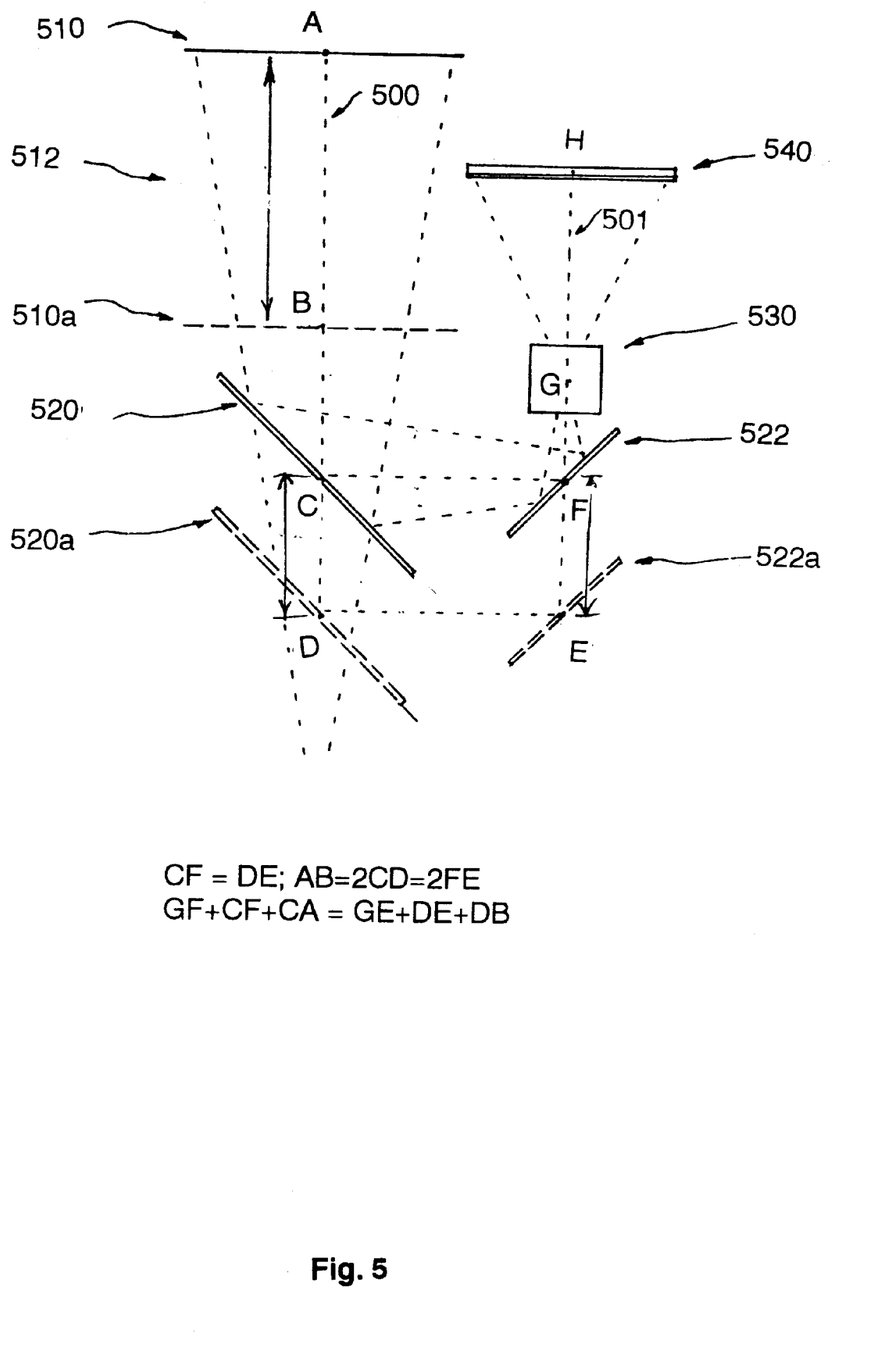
FIG. 5 the principle of the reciprocating reflectors mechanism.

In the Reciprocating Approach, three image delivery mechanisms can be used. The first mechanism is the reciprocating reflectors mechanism, which consists of a pair of reciprocating reflectors moving synchronously with but at a speed of ½ of the speed of the reciprocating screen. FIG. 5 illustrates this idea. 2D image frames are created on the display panel 540 and projected through the lens 530 and the reflector-pair 520 and 522 onto the screen 510. The display panel and the lens are stationary. The screen reciprocates between position 510 and 510a to form a display space 512, along a path 500, which is parallel to the projector axis 501. As the screen 510 moves, the reflector-pair 522 and 520 moves in the same direction as the screen but at a speed half of the screen speed. As a result, the projecting distance from the display panel to the screen is always kept constant, as illustrated in FIG. 5, thereby the image is always in focus and magnification and orientation are preserved. The reciprocating motion can be achieved by using rotating disks, crank arms, and linear slides. The speed ratio between the screen and the reflector-pair can be maintained by using two motors controlled by a micro-computer, or by using mechanical means such as timing belt and gears.

Figure 6A:
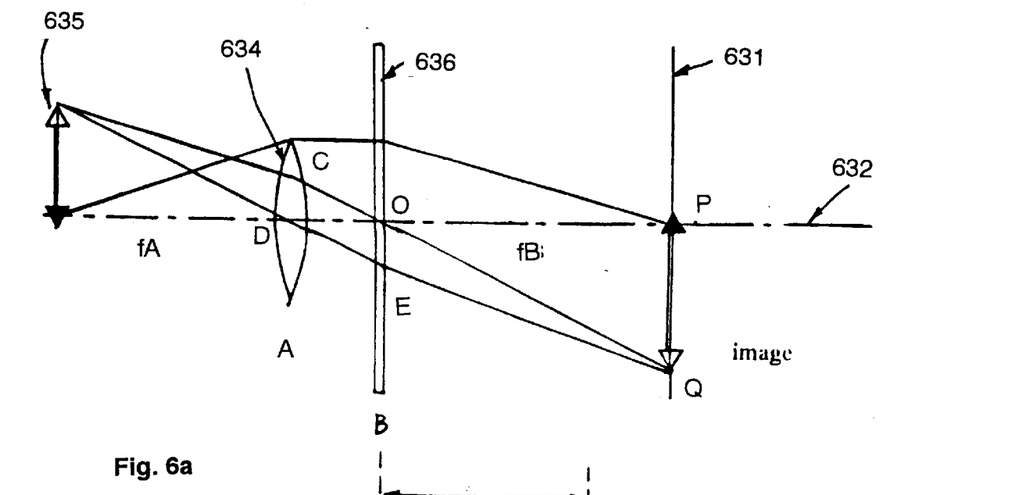
FIG. 6 illustrates the principle of the moving condenser mechanism.
Figure 6B:
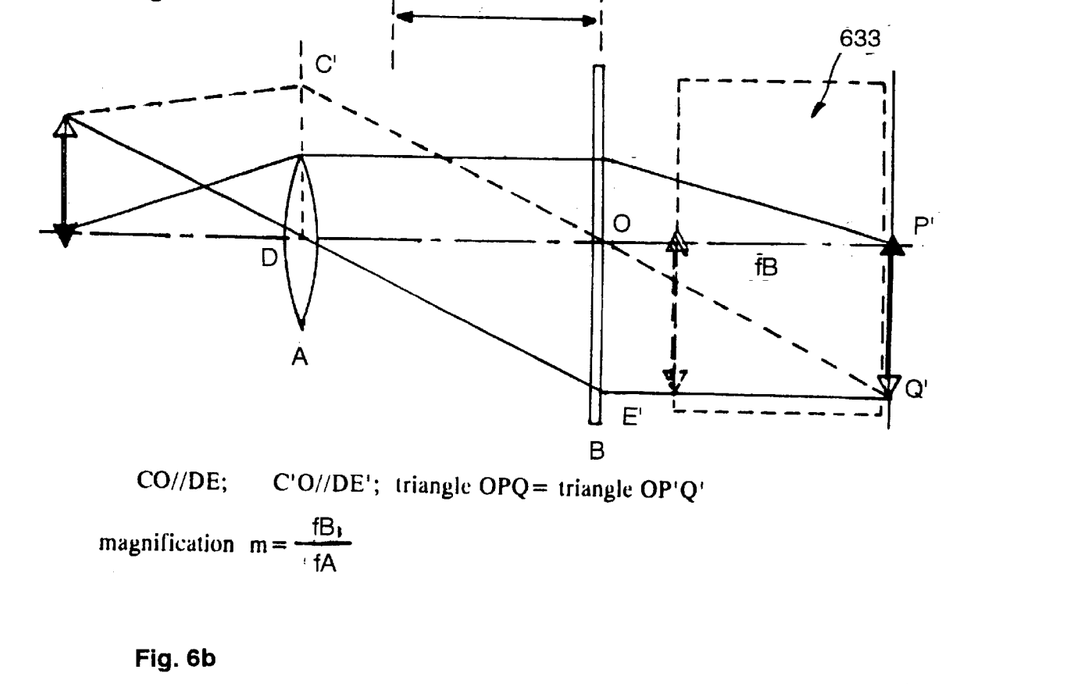

The second mechanism is the moving condenser mechanism, which consists of a pair of converging lens aligned to the same optical axis. The basic concept is illustrated in FIG. 6. The first lens 634 is fixed and has the image generating panel 635 of the image projector at its focal plane. The second lens 636 reciprocates with the screen 631 and always has the screen at its focal plane. This configuration is similar to a condenser lens consisting of two converging lenses. Optically, magnification, orientation, and focus of the projected image on the screen are kept constant as the screen and the second lens 636 move synchronously relative to the stationary display panel and the first lens. It can be proved through simple sketch of ray tracing as shown in FIG. 6 that the magnification of the setup is the ratio of the focal length of the second lens to that of the first lens. FIG. 6a and 6b illustrate the principle of image formation by ray tracing sketches. By reciprocating the screen and second lens assembly, a volume capable of displaying 3D volumetric image can be defined 633. The reciprocating motion can easily be achieved by using a rotating disk, a crank arm, and a linear slide.

Figure 7:
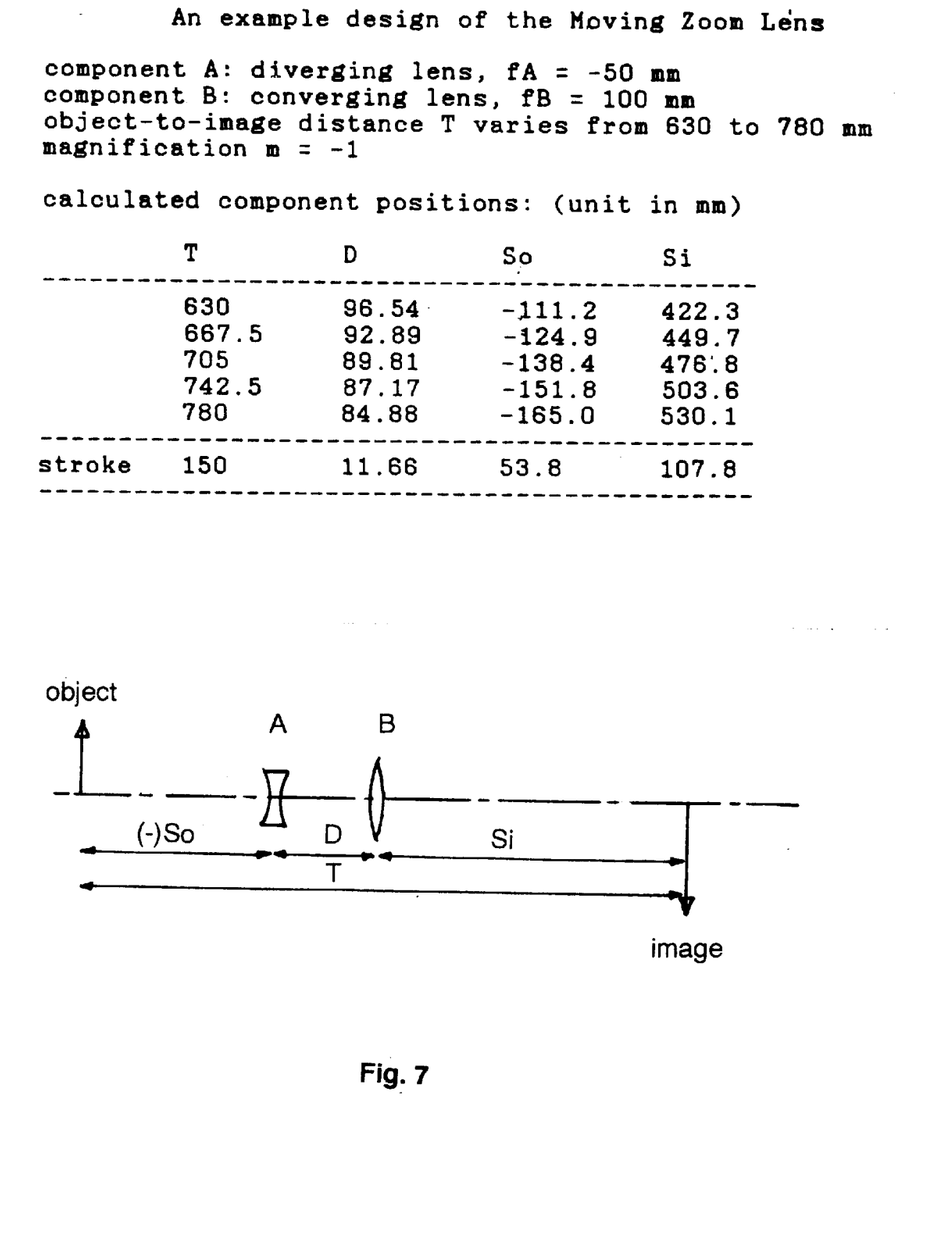
FIG. 7 illustrates the principle of the moving zoom lens mechanism.

The third mechanism is the moving zoom lens mechanism, which consists of a zoom projection lens which zooms in response to the reciprocating motion of the screen such that the images can be projected onto the moving screen with their size, focus, and orientation invariant. Image is projected onto the screen through a zoom lens and magnification and focus are maintained by zooming and fousing the zoom lens constantly as the screen moves. In principle, any zoom lens can be approximated by and decomposed into two components. A two-lens model of zoom lens is therefore used as an example of embodiment. FIG. 7 shows an example design illustrating how each lens moves to achieve the function. This example design uses one diverging lens A and one converging lens B. The distance between the display panel (object) and the object lens So, the distance between the two lenses D, and the distance from the image lens to the screen Si are listed with respect to 5 different screen positions. This layout calculation was based on first order ray tracing method. The equations and method of analysis are included in Appendix A. As illustrated in the table in FIG. 7, the image magnification and focus on the moving screen can be maintained constant by driving the two lenses respectively to proper positions relative to the screen as the screen reciprocates. This motion can be achieved by using precision linear stages driven by servomotors and controlled by a micro-computer. Alternatively, cam wheels with specifically designed profile can also be used to move the lens elements.

The image generating panel of the image projector, in principle, can be of any type of display device, such as cathode ray tube or LCD (liquid crystal display) panel. For displaying complex volumetric 3D images, the image projector must have high frame refresh rate and high brightness. According to experimental observation by the applicant, good volumetric 3D images can be seen at a volume refresh rate of 7–10 Hz (i.e. 7–10 volume sweeps per second). At 15 Hz, flicker-free images can be obtained. Also, in an environment with background lighting smaller than 1 footcandle, the screen brightness should not be smaller than 5 footcandle. Assuming a 10 Hz volume refresh rate and 500 frames are required in each volume sweep, then the frame refresh rate requirement on the image projector is 5000 Hz. That is, the response time of the display device should be shorter than 0.2 msec. Three display technologies can satisfy these requirements:

(1) light-emitting diode (LED): Commercial super-bright LED arrays can be assembled into larger panels and be used as the image generating panel. The response time of LED is on the order of 10 nano second.

(2) ferroelectric liquid crystal (FLC): The response time of FLC can be short to 1 micro-second. [Clark 1981] Small FLC display panels, with 128×128 to 256×256 pixels and 4000–10000 Hz refresh rate, are commercially available, e.g. from Displaytech Inc. and Boulder Nonlinear System, both of Boulder, Colo. (3) digital micro-mirror device (DMD): A DMD chip contains a matrix of tiny micromirrors, each mirror represents a pixel and can be tilted by a voltage applied to electrodes underneath it. By illuminating the chip and selectively tilting the mirror in the matrix, images can be created by reflection. The response time of each pixel is 10 micro second. DMD is being commercialized by the Texas Instruments Inc. [Mignardi 1994].

Figure 8A:
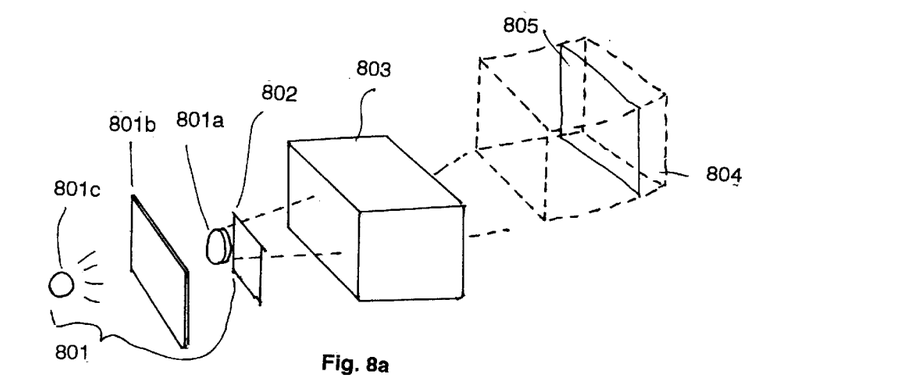
FIG. 8 illustrates principle of controlling the form and the location of 3D volumetric images by switching the projection light.
Figure 8B:
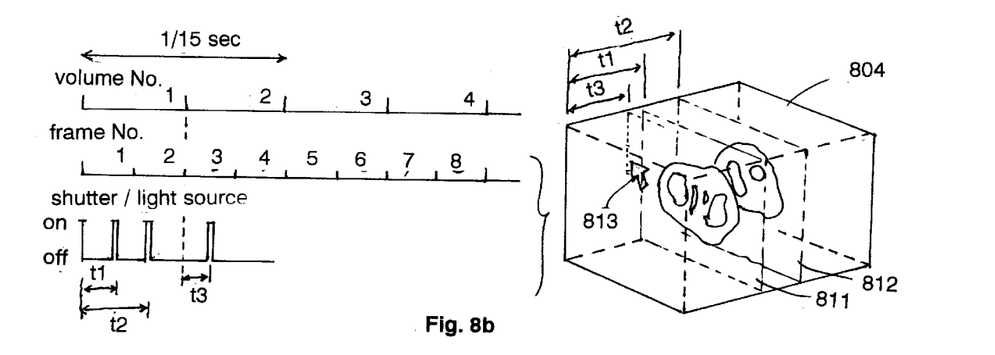
Figure 8C:
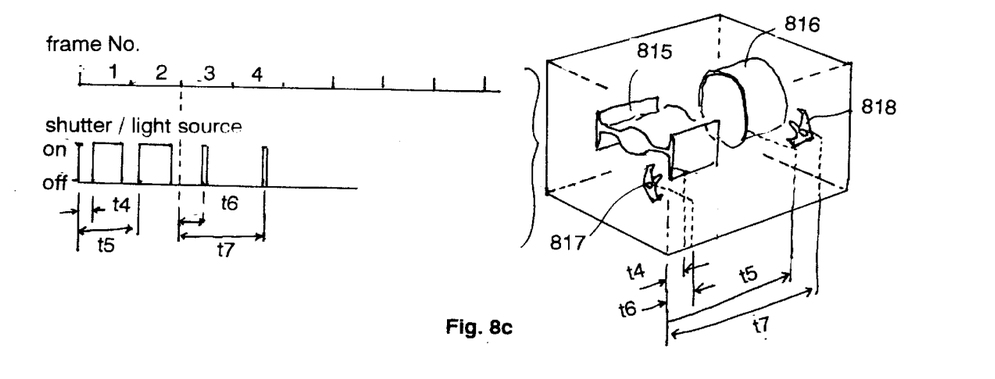

Although an image projector with high frame refresh rate is desirable, a image projectors with a lower frame refresh rate can also be used as the image source for certain applications, by using a high speed shutter with it. FIG. 8 illustrates the idea. FIG. 8a shows a generic volumetric image display apparatus of this invention. The image projector 801 includes a light source 801c, a display panel 801b, and a projection lens 801a. A high speed shutter 802 is placed between the lens and the image delivery mechanism 803. A display space 804 is formed by a moving screen 805. The display panel can be a regular active matrix LCD projection panel, which usually has a frame refresh rate of 60 Hz. A preferred embodiment of the shutter 802 is a FLC shutter, which can be switched at several thousands Hz. Such a FLC shutter can be obtained from, e.g., Displaytech Inc. of Boulder, Colo. With this apparatus, by controlling the switch timing of the shutter, the location and the form of the images in the display space can be controlled. The image frame displayed on the display panel 801b can be placed inside the display space at desired location to form either a planar image or a volumetric 3D image of extruded 2D geometry. FIG. 8b and 8c illustrate some examples. Assuming a display panel of 60 frames/sec is used and the moving screen creates 30 volume sweeps per second. As a result, for every 1/15 sec, the flicker-free time period, two volumes can be shown. For convenience of description, assuming the moving screen sweeps all volume in the same direction and assuming the display space is rectangular. During each volume, two frames are refreshed on the display panel. Therefore, two different image frames can be displayed in one volume and their locations in the display space can be controlled by timing the switch of the shutter. FIG. 8b shows two cross-sectional view of a 3D data, e.g. a human body medical image, can be displayed by opening the shutter at t1 for a brief time to place frame 1 (811) at location to in the display space 804; and by opening the shutter briefly at t2 to place frame 2 (812) at t2. During the brief opening of the shutter, the moving screen travels only a very small distance in the display space, so the image frames appear as 2D frames floating in the display space. Because the observer can see more than two volumes during 1/15 sec, a different image can be placed close to either one of the cross-sectional images by displaying it in the second volume that follows. For example, a cursor image in frame 3 (813) can be placed at t3, close to t1, and appears adjacent to the frame 1 image 811. By opening the shutter for a longer time, such that the screen moves a significant distance in the display space, 3D volumetric images of extruded 2D geometry can be created. Although only limited geometry can be created by this method, it can be useful for creating visual effect or simple geometry for applications in electronic games. FIG. 8c illustrates two extruded images 815 and 816 can be formed by opening the shutter a significant time at t4 and t5. Other images, such as the action figures or icons in an electronic game 817 and 818 can be superimposed to the extruded images by displaying them in the second volume that follows. In this example, the frame 1 of the display panel contains image 815, frame 2 contains image 816, frame 3 has image 817, and frame 4 has image 818.

In the case of Rotating Approach, the shutter used in the embodiment of FIG. 3a can function as the shutter described in FIG. 8a. Alternatively, the projection light can be modulated by switching the light source directly by, for example, using a strobe light as the source.

By projecting images of slight variations into successive volume sweeps, animation of 3D volumetric images can be created.

References

Batchko, R. G. "Rotating Flat Screen Fully Addressable Volume Display System", U.S. Pat. No. 5,148,310, 1992

Berlin, E. P. "Three Dimensional Display", U.S. Pat. No. 4,160,973

Benton, S. A. and Kollin, J. S. "Three Dimensional Display System", U.S. Pat. No. 5,172, 251. 1992

Blundell, B. G. et al. "Cathode Ray Sphere: a Prototype System to Display Volumetric Three-dimensional Images", *Optical Engineering*, January, 1994, v. 33, n. 1, p. 180

Clark, N. A. and Lagerwell, S. T. "Physics of Ferroelectric Fluids: the Discovery of a High Speed Electro-optic Switching Process in Lquid Crystals, in Recent Developments in Condensed Matter Physics", v. 4, ed. by Devreese, J. T. et al., Plenum Press, New York, 1981

Hattori, T. et al., "Spatial Modulation Display using Spatial Light Modulators", Optical Engineering, vol. 31, No. 2, p.350 1992

Korevaar, E. J. "Three Dimensional Display Apparatus", U.S. Pat. No. 4,881,068, 1989

Mignardi, M. A., "Digital Micromirror Array for Projection TV", *Solid State Technology*, v.37, n.7, p.63, 1994

MIT Report, "Holographic Video", The MIT Report Dec/Jan 1990–91

Paek, E. G. et al. "A 2D Projection Display using PDLCs", presented at the Conference of the International Society for Optical Engineering, Jan. 29–Feb. 2, 1996, San Jose, Calif.

Rowe, W. G. "Three Dimensional Display Device", U.S. Pat. No. 4,063,233, 1977

Shandle, J. "3D Display Combines Fast LCD Screen and Lenslets", *Electronic Design*, July, 1993, p. 36

Soltan, P. et al. "Laser based 3D Volumetric Display system", SPIE v. 1664, High Resolution Display and Projection Systems, 1992

Traub, A. C. "tereoscopi Display Using Rapid Varifocal Mirror Oscillators", *Applied Optics*, v. 6. p. 1085, 1967

Walko, J. "Sharp Claims Advance in 3D Moving Images", *Photonics Spectra*, March, 1995, p. 28

Williams, R. D.and Garcia, F. "Volume visualization displays", Information Display, 4/89, p. 8, also see Garcia and Williams, U.S. Pat. Nos. 5,172,266, 5,042,909, Solomon, D. "Volumetric imaging launches graphics into a 3-D world", *Photonics Spectra*, June, 1993, p.129

APPENDIX A RAY TRACING METHOD

This section includes the formula of ray tracing method used to determine the arrangement and the components of an optical system. In general, most system are either limited to two components or can be separated into two-component segments. The mathematical formula for solving two-component system is relatively simple. For references, please see [(Smith 1992, Hecht 1987].

For a two-component system operates at finite conjugates as shown in FIG. A–1, the following equations apply. In case the required system magnification m and the component locations are known, the focal length of the components are given by:

$$fA = mSoD/(mSo - mD - Si) \quad (1)$$

$$fB = DSi/(D - mSo + Si) \quad (2)$$

where fA and fB are the focal lengths of the components (positive for converging lens and negative for diverging lens), D is the distance between the components, So is the distance between the object and component A, Si is the distance between the image and component B.

In case the component poSers (defined as the reciprocal of the focal length), the object-to-image distance TD and the magnification m are known, the component locations can be determined from:

$$T = -(D^2 + (m-1)^2 * fA * fB/m)/(fA + fB - D) \quad (3)$$

$$So = [(m-1)D + T]/[(m-1) - mD/fA] \quad (4)$$

$$Si = T + So - D \quad (5)$$

In general, there are 6 unknowns, fA, fB, D, So, Si, and m. Given any four known parameters, the rest parameters can be obtained by solving equation (1) & (2) or (3) & (4).

FIG. A-1 Definition of component locations in the layout of a two-component optical system

I claim:

1. An apparatus for displaying 3D volumetric images comprises
   (1) screen revolving about an axis;
   (2) an image delivery mechanism comprising a multi-mirror relay reflector revolving at ½ the speed of said screen, a light shutting means, and a motion mechanism translating the multi-mirror reflector as it rotates and thereby having said axis always parallel to and passing through one of the reflective surfaces of the multi-mirror reflector;
   (3) an image projector.

2. An apparatus of claim 1, said light shutting means comprises a light shutter with two shutter areas; said motion mechanism comprises
   (1) a slide carrying the multi-mirror relay reflector;
   (2) a cam that translates said slide; and
   (3) a gear and belt means that rotates said multi-mirror relay reflector at ½ the speed of said screen.

3. An apparatus of claim 1, said image projector includes at least one high frame rate image generating panel.

4. An apparatus of claim 3, said high frame rate image generating panel comprises a panel of light-emitting diodes, or a ferroelectric liquid crystal display panel, or a digital micro-mirror device.

5. A method for dismaying 3D volumetric images, comprises the steps of:
   (1) displaying in sequence a set of 2D image frames on an image generating panel;
   (2) revolving a screen rapidly about a first axis and thereby defining a display space;
   (3) rotating a multi-mirror reflector about a second axis, at a speed ½ of the revolving speed of said screen;
   (4) projecting in sequence said 2D image frames, through said multi-mirror reflector, onto said screen.

6. A method of claim 5, further comprises a step of translating the multi-mirror reflector as it rotates and having said first axis always parallel to and passing through one of the reflective surfaces of the multi-mirror reflector.

7. A method of claim 5, further comprises a step of modulating the projection beam containing said 2D image frames to control the location and form of the images displayed in the display space.

8. A method of claim 7, said step of modulating the projection beam includes switching the light source or using a light shutter.

9. A method of claim 5, the step of projecting the 2D image frames further includes the step of projecting images of different contents into two or more successive volume sweeps such that said contents appeared superimposed in the same display space.

10. A method of claim 5, the step of projecting the 2D image frames further includes the step of projecting images of slight variations into successive volume sweeps to create animation of 3D volumetric images.

11. A method for displaying 3D volumetric images, comprises the steps of:
    (1) displaying in sequence a set of 2D image frames on an image generating panel;
    (2) reciprocating a screen rapidly and thereby defining a display space;
    (3) projecting in sequence said 2D image frames, through a reciprocating optical means, onto said screen; said moving optical means maintaining the size and focus of the projected image frames invariant and the orientation of the projected image frame in synchronization with the moving screen.

12. A method of claim 11, said screen reciprocates along an axis; said reciprocating optical means includes the steps of:
    (1) reciprocating a reflectors system in synchronization with the motion of the screen but at a speed ½ of the speed of the reciprocating screen;
    (2) projecting said 2D image frames, through the reciprocating reflectors system, onto said screen.

13. A method of claim 11, said screen reciprocates along an axis; said reciprocating optical means includes the steps of:
    (1) placing a first lens before the screen and having the screen at its focal plane; said first lens reciprocates in unison with the screen;
    (2) projecting the 2D image frames by a second lens, through said first lens, onto the screen; said second lens having the image generating panel at its focal plane.

14. A method of claim 11, said screen reciprocates along an axis; said reciprocating optical means includes the steps of:
    (1) projecting the 2D image frames by a zoom lens onto the screen;
    (2) zooming the lens in synchronization with the motion of the screen such that the size, focus, and orientation of the projected image frames are kept invariant with respect to the screen.

15. A method of claim 11, further comprises a step of modulating the projection beam containing said 2D image frames to control the location and form of the images displayed in the display space.

16. A method of claim 15, said step of modulating the projection beam includes switching the light source or using a light shutter.

17. A method of claim 11, the step of projecting the 2D image frames further includes the step of projecting images of different contents into two or more successive volume sweeps such that said contents appeared superimposed in the same display space.

18. A method of claim 11, the step of projecting the 2D image frames further includes the step of projecting images of slight variations into successive volume sweeps to create animation of 3D volumetric images.

* * * * *

UNITED STATES PATENT AND TRADEMARK OFFICE
CERTIFICATE OF CORRECTION

PATENT NO. : 5,954,414
DATED : September 21, 1999
INVENTOR(S) : Che-Chih Tsao

Page 1 of 1

It is certified that error appears in the above-identified patent and that said Letters Patent is hereby corrected as shown below:

Column 1,
Line 24, change "Report 1990" into -- MIT Report 1990 --.
Line 30, change "3D)" into -- 3D --.

Column 4,
Line 8, change "14a)" into -- 14a --.

Column 10,
At the end of Appendix, insert -- References: (1) Hecht, E. *Optics*, 2nd ed., Addison-Wesley, Reading MA, 1987; (2) Smith, W.J. "First-order Layout - from imagery to achromatism to athermalization to cost" in Lens Design, ed. by W.J. Smith, SPIE Optical Engineering Press, Belingham, Washington, 1992. --

Column 12, claim 11,
Line 32, change "moving" into -- reciprocating --;
Line 35, change "moving" into -- reciprocating --.

Signed and Sealed this

Thirtieth Day of October, 2001

Attest:

*Attesting Officer*

NICHOLAS P. GODICI
*Acting Director of the United States Patent and Trademark Office*